United States Patent [19]

Reuveni et al.

[11] Patent Number: 5,179,890
[45] Date of Patent: Jan. 19, 1993

[54] PASTEURIZING MACHINE

[76] Inventors: Zohar Reuveni, Moshav Beit Herut; Itzhak Eshtein, 18 Mivtza Kadesh Street, Rishon Lezion, both of Israel

[21] Appl. No.: 641,743

[22] Filed: Jan. 15, 1991

[30] Foreign Application Priority Data

Jan. 18, 1990 [IL] Israel .................................... 93099

[51] Int. Cl.⁵ ................................................ A23L 3/00
[52] U.S. Cl. ...................................... 99/362; 99/404; 99/443 C; 99/483; 99/536; 134/73; 134/108
[58] Field of Search .......................... 99/404, 360-362, 99/483, 516, 534, 536, 477; 134/108, 131, 73; 68/158

[56] References Cited

U.S. PATENT DOCUMENTS

| | | | |
|---|---|---|---|
| 806,354 | 12/1905 | Loew | 99/362 |
| 989,141 | 4/1911 | Gettelman | 99/362 |
| 1,082,743 | 12/1913 | Gettelman | 99/362 |
| 1,466,799 | 9/1923 | Miller | 99/536 |
| 2,025,990 | 12/1935 | Kokemper | 99/362 |
| 2,683,365 | 7/1954 | Brooks, Jr. | 68/158 |
| 2,745,419 | 5/1956 | Slingerland | 134/108 |
| 3,044,474 | 7/1962 | Veeder | 134/73 |
| 3,447,544 | 6/1969 | Vergara | 99/536 X |
| 3,868,897 | 3/1975 | Moreau | 99/483 |
| 4,844,106 | 7/1989 | Hunter et al. | 134/131 |

FOREIGN PATENT DOCUMENTS

| | | | |
|---|---|---|---|
| 1097795 | 1/1961 | Fed. Rep. of Germany | 99/361 |
| 288573 | 1/1971 | U.S.S.R. | 134/73 |

Primary Examiner—Timothy F. Simone
Attorney, Agent, or Firm—Renner, Otto, Boisselle & Sklar

[57] ABSTRACT

A pasteurizing machine which automatically adjusts the level of the pasteurizing water, and which comprises three water containers placed superposed to one another. The pasteurizing water is heated in the lowermost container and pumped to the upper one. The bottom of said upper container is provided with apertures which permit dripping of water into the intermediate container in which a conveyor belt travels.

4 Claims, 1 Drawing Sheet

PASTEURIZING MACHINE

FIELD OF THE INVENTION

The present invention relates to a system and apparatus for pasteurizing products.

BACKGROUND OF THE INVENTION

Pasteurizing food products is performed by pasteurizing machines all of which operate on substantially the same principle, namely immersion of the respective product in a vessel of hot water or within a steam container. Products which are lighter than the water float on the surface and are thus not subjected to optimal conditions.

There are known continuous pasteurizing machines which employ the use of an endless belt on which the products are placed. The belt carries the product through a bath of hot water. A further belt which is placed over the first belt ensures that the products are kept immersed in water during their travel through the water.

It is understood that pasteurizing machines must include means which will ensure that the whole product is fully immersed in hot water during its travel through the pasteurizing bath.

OBJECTS OF INVENTION

It is thus the object of the present invention to provide a continuous automatic pasteurizing machine.

It is a further object of the present invention to provide a pasteurizing machine which will pasteurize the products by immersion as well as by spraying.

It is yet a further object of the present invention to provide a machine which automatically will regulate the level of the water within the bath to ensure optimal heat coverage to the product.

SUMMARY OF THE INVENTION

According to the invention there is provided a pasteurizing machine which automatically adjusts the level of the pasteurizing water and which comprises three water containers placed superposed to one another, the water being heated in the lower most container and being pumped to the upper most container, the bottom surface thereof being provided with apertures to permit the water to drip into the intermediate container in which a conveyor belt travels, the level of the water being adjusted by an adjustable gate plate provided at one of the side walls of said intermediate container.

BRIEF DESCRIPTION OF DRAWINGS

The invention will now be described with reference to the annexed drawings in which.

DESCRIPTION OF PREFERRED EMBODIMENT

Figure 1:
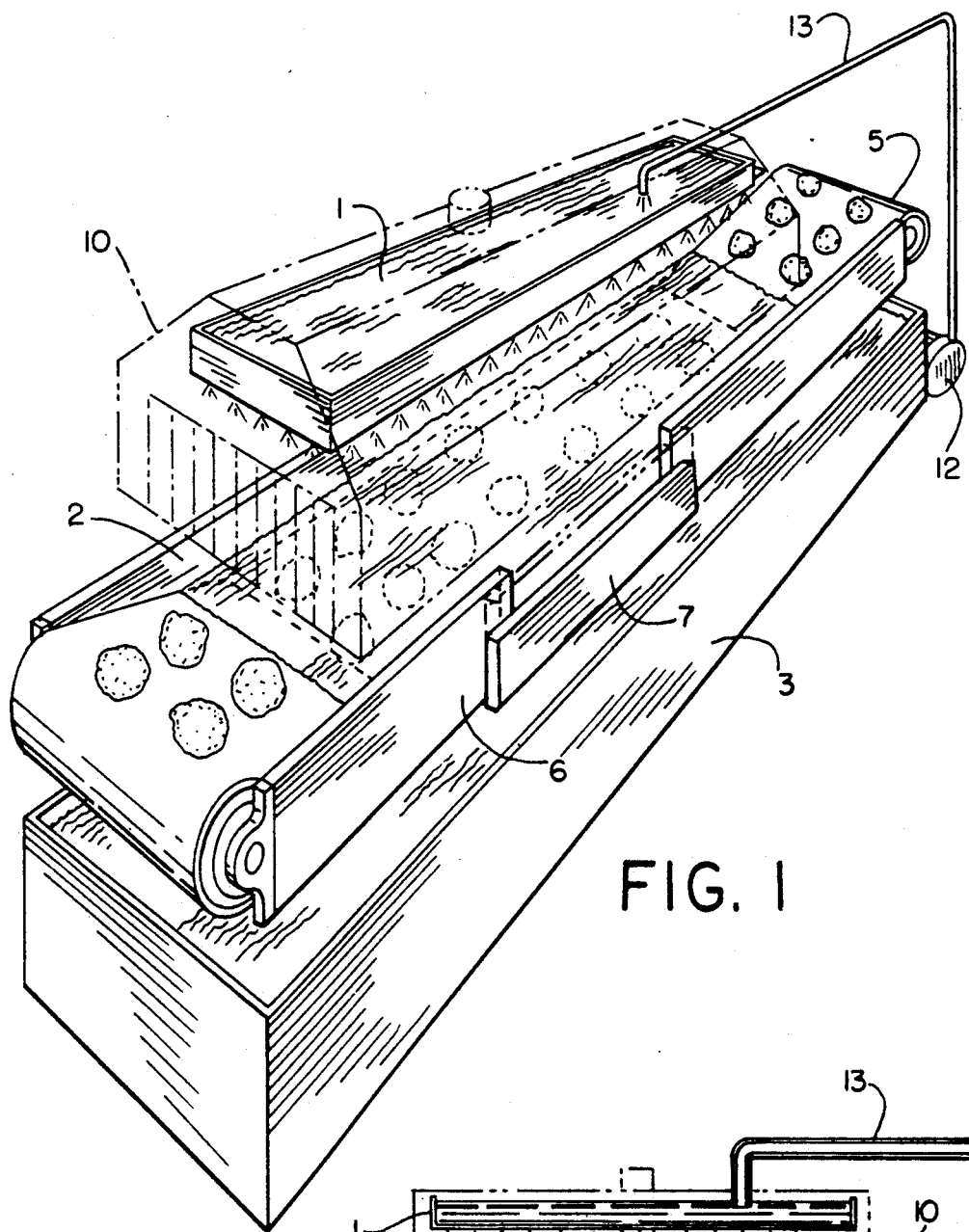
FIG. 1 is a perspective phantom illustration of the pasteurizing machine according to the invention.
Figure 2:
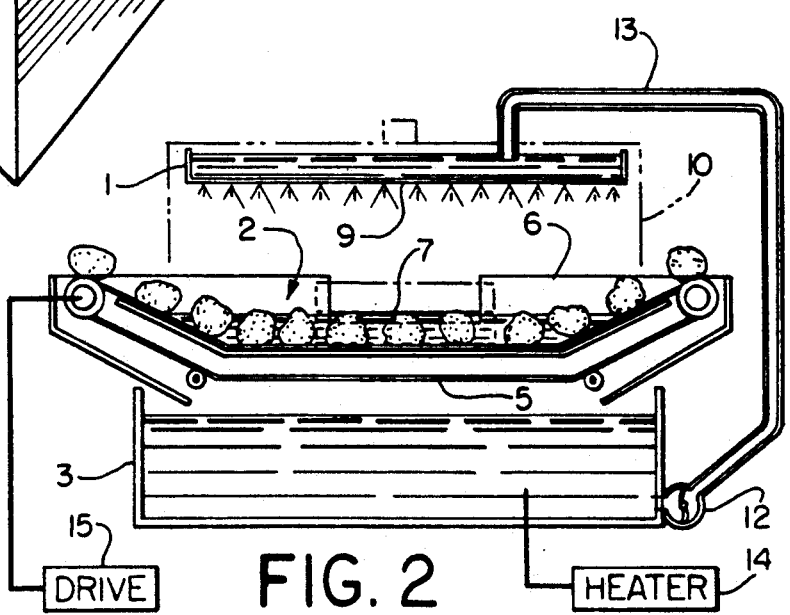
FIG. 2 is a lateral elevational view, partly in section of the machine according to the invention.

The machine comprises three water containers—an upper container 1, intermediate container 2 and lower container 3. A conveyor belt 5 is placed such that the upper run thereof travels within intermediate container 2.

Side wall 6 of container 2 is provided with an opening and an adjustable gate like closure 7.

The bottom of upper container 1 is provided with apertures 9 and cover 10 to cover container 1 and part of the space thereunder. The lower container 3 is provided with heating means 14 shown and a pump 12 which raises the water from said container via a conduit 13 into the upper container 1.

The machine operates in the following manner.

The food products which are to be pasteurized are placed on the conveyor belt 5, for which a drive 15 is provided, gate 7 is adjusted to such a level that the upper edge thereof is substantially flush with the food products. On activation of the machine, hot water from the lower container 3 is pumped up into container 1 by means of pump 12. The hot water drips through apertures 9 on the food products and into container 2. The water within container 2 will reach the height of gate 7 and then spill over back into container 3 where it is reheated. It is quite obvious that the food product will not float on the water as the water is too shallow. The food products will thus be treated all over from the water within container 2 and from above by the water dripping from container 1.

What is claimed is;

1. A pasteurizing machine comprising lowermost, uppermost and intermediate water containers placed superposed to one another, the water being heated in the lowermost container and being pumped to the uppermost container, the uppermost container having a bottom surface provided with apertures to permit the water to drip into the intermediate container in which a conveyor belt travels, and means being provided for adjusting the level of the water relative to the level of the conveyor belt traveling through the intermediate container.

2. A pasteurizing machine as claimed in claim 1 wherein said means for adjusting includes an adjustable gate plate provided at one of the side walls of said intermediate container.

3. A pasteurizing machine as claimed in claim 1 wherein the speed of travel of said conveyor belt is adjustable.

4. A pasteurizing system for pasteurizing products which are lighter than water, comprising three superposed water containers including an upper container, an intermediate container and a bottom container, means for pumping water from the lower container to the upper container, a conveyor belt for carrying the products through the intermediate container with upper portions thereof exposed above the level of the water in the intermediate container, and means for discharging water from the intermediate container into the lower container while maintaining the level of water in the intermediate container at a level such that products carried by the conveyor belt will be at least partly submerged as they are carried by the conveyor belt through the intermediate container, and wherein the upper conveyor has a bottom surface provided with apertures to permit water to drip onto the exposed upper portions of the products being carried by the conveyor belt and into the intermediate container.

* * * * *